(12) United States Patent
Zheng et al.

(10) Patent No.: US 10,120,211 B2
(45) Date of Patent: Nov. 6, 2018

(54) SELF-TUNED SILICON-PHOTONIC WDM TRANSMITTER

(71) Applicant: Oracle International Corporation, Redwood Shores, CA (US)

(72) Inventors: Xuezhe Zheng, San Diego, CA (US); Ying Luo, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 15/346,565

(22) Filed: Nov. 8, 2016

(65) Prior Publication Data

US 2018/0231808 A1 Aug. 16, 2018

(51) Int. Cl.
*G02F 1/025* (2006.01)
*G02B 6/12* (2006.01)
*H04J 14/02* (2006.01)
*G02F 1/01* (2006.01)
*G02B 6/293* (2006.01)

(52) U.S. Cl.
CPC ......... *G02F 1/025* (2013.01); *G02B 6/12007* (2013.01); *G02B 6/2938* (2013.01); *G02F 1/0147* (2013.01); *H04J 14/02* (2013.01); *G02B 2006/12142* (2013.01); *G02F 2203/055* (2013.01); *G02F 2203/15* (2013.01); *G02F 2203/70* (2013.01)

(58) Field of Classification Search
CPC ............ G02B 2006/12142; G02B 6/12; G02B 6/12007; G02B 6/293; G02B 6/2938; G02F 1/01; G02F 1/0147; G02F 1/025; G02F 2203/055; G02F 2203/15; G02F 2203/70; H04J 14/02
See application file for complete search history.

(56) References Cited

U.S. PATENT DOCUMENTS

| | | | |
|---|---|---|---|
| 8,467,122 B2 * | 6/2013 | Zheng | H01S 5/142 359/333 |
| 8,988,770 B2 * | 3/2015 | Zheng | H01S 5/142 359/344 |
| 9,059,559 B2 * | 6/2015 | Zhang | H01S 5/141 |
| 9,450,379 B2 * | 9/2016 | Zhang | H01S 3/005 |

(Continued)

*Primary Examiner* — Andrew Jordan
(74) *Attorney, Agent, or Firm* — Park, Vaughan, Fleming & Dowler LLP

(57) ABSTRACT

An optical transmitter includes: a set of reflective silicon optical amplifiers (RSOAs), a set of ring modulators, a shared broadband reflector, a set of intermediate waveguides, and a shared waveguide. Each intermediate waveguide channels light from an RSOA in proximity to an associated ring modulator to cause optically coupled light to circulate in the associated ring modulator. The shared waveguide is coupled to the shared broadband reflector, and passes in proximity to the set of ring modulators, so that light circulating in each ring modulator causes optically coupled light to flow in the shared optical waveguide. During operation, each RSOA forms a lasing cavity with the shared broadband reflector, wherein each lasing cavity has a different wavelength, which is determined by a resonance of the associated ring modulator. The different wavelengths are combined in the shared waveguide to produce a combined output.

20 Claims, 6 Drawing Sheets

(56) References Cited

U.S. PATENT DOCUMENTS

| | | | |
|---|---|---|---|
| 9,638,858 B2* | 5/2017 | Luo | H01S 5/141 |
| 9,654,225 B2* | 5/2017 | Rylyakov | H04B 10/58 |
| 9,667,026 B2* | 5/2017 | Komljenovic | H01S 3/10092 |
| 9,735,542 B2* | 8/2017 | Li | H01S 5/142 |
| 9,778,493 B1* | 10/2017 | Krishnamoorthy | G02F 1/011 |
| 9,831,635 B2* | 11/2017 | Zhang | H01S 5/141 |
| 9,882,349 B1* | 1/2018 | Krishnamoorthy | H01S 5/0687 |
| 9,939,663 B2* | 4/2018 | Luo | G02F 1/011 |
| 9,941,976 B2* | 4/2018 | Rylyakov | H04B 10/58 |
| 2013/0016423 A1* | 1/2013 | Zheng | H01S 5/142 359/344 |
| 2013/0016744 A1* | 1/2013 | Li | H01S 5/1039 372/20 |
| 2014/0268312 A1* | 9/2014 | Zheng | H01S 5/1028 359/344 |
| 2015/0139264 A1* | 5/2015 | Zhang | H01S 5/141 372/107 |
| 2015/0180201 A1* | 6/2015 | Zhang | H01S 3/005 372/20 |
| 2016/0204578 A1* | 7/2016 | Li | H01S 5/1032 372/20 |
| 2016/0380408 A1* | 12/2016 | Zhang | H01S 3/005 372/20 |
| 2017/0063022 A1* | 3/2017 | Komljenovic | H01S 3/10092 |
| 2017/0085324 A1* | 3/2017 | Rylyakov | H04B 10/58 |
| 2017/0139237 A1* | 5/2017 | Luo | G02F 1/011 |
| 2017/0222730 A1* | 8/2017 | Rylyakov | H04B 10/58 |
| 2018/0062351 A1* | 3/2018 | Zhang | H01S 5/141 |
| 2018/0143461 A1* | 5/2018 | Zheng | H01S 5/3013 |

\* cited by examiner

SELF-TUNED SILICON-PHOTONIC WDM TRANSMITTER

GOVERNMENT LICENSE RIGHTS

This invention was made with U.S. government support under Agreement No. HR0011-08-9-0001 awarded by DARPA. The U.S. government has certain rights in the invention.

FIELD

The disclosed embodiments generally relate to the design of an optical transmitter. More specifically, the disclosed embodiments relate to the design of a hybrid III-V/Si optical transmitter, which is designed to operate without requiring multi-wavelength feedback control.

RELATED ART

Wavelength-division multiplexing (WDM) silicon-photonic link technology provides a promising way to provide interconnections in future processors and computing systems with significant advantages in energy efficiency and bandwidth density. However, using WDM silicon-photonic link technology also gives rise to complications. For example, FIG. 1A presents a block diagram of a conventional WDM transmitter 100. WDM transmitter 100 includes three basic components: (1) constant-wave (CW) laser sources 111-114 with different wavelengths ($\lambda_1$, $\lambda_2$, $\lambda_3$, $\lambda_4$), which have a fixed wavelength spacing; (2) electro-optical (EO) modulators 121-124 that modulate the CW carrier wavelengths ($\lambda_1$, $\lambda_2$, $\lambda_3$, $\lambda_4$) to convert electrical data into modulated optical signals; and (3) an optical WDM multiplexer (MUX) 130, which combines the modulated wavelength channels in a single waveguide, which provides the WDM transmitter output 140. For WDM transmitter 100 to work properly, the wavelength channels of all the WDM components need to be aligned with each other. However, because the operating wavelengths of silicon devices are subject to fabrication variations and ambient temperature changes, wavelength tuning and a control mechanism are typically required, which makes such WDM transmitters both complicated and power-hungry.

A simpler WDM transmitter 150 can be built with a reduced number of components by using a comb laser source 160 and cascaded ring modulators 170 to produce output 180 as depicted in FIG. 1B. Note that a suitable comb laser source 160 with accurate channel spacing can be fabricated by using hybrid integration of a III-V array gain chip with a cascaded Vernier ring. (For example, see U.S. patent Ser. No. 15/047,090, entitled "Ring Resonator-Based Laser with Multiple Wavelengths" by inventors Jock T. Bovington and Xuezhe Zheng, filed 18 Feb. 2016, the contents of which are hereby incorporated herein by reference.) In such a simplified WDM transmitter, the wavelength multiplexer becomes part of the laser source. Hence, there is one less WDM device to tune and control. However, the rings in the comb laser source 160 still need to be tuned and controlled for alignment with the desired cavity modes, and the cascaded ring modulators 170 need to be tuned and controlled for wavelength alignment with the laser wavelengths from the comb source.

Hence, what is needed is a WDM transmitter that can be implemented without the drawbacks of the above-described WDM transmitters.

SUMMARY

The disclosed embodiments provide an optical transmitter that includes: a set of reflective silicon optical amplifiers (RSOAs), which includes two or more RSOAs; a set of ring modulators, which modulate optical signals based on electrical input signals; and a shared broadband reflector. The optical transmitter also includes a set of intermediate waveguides, wherein each intermediate waveguide in the set is coupled to an RSOA in the set of RSOAs, and channels light from the RSOA in proximity to an associated ring modulator in the set of ring modulators to cause optically coupled light to circulate in the associated ring modulator. The optical transmitter also includes a shared waveguide with a first and a second end, wherein the first end is coupled to the shared broadband reflector, and wherein the shared waveguide passes in proximity to the set of ring modulators, so that light circulating in each ring modulator in the set causes optically coupled light to flow in the shared optical waveguide. During operation, each RSOA in the set of RSOAs forms a lasing cavity, which includes an associated intermediate waveguide in the set of intermediate waveguides, an associated ring modulator in the set of ring modulators, the shared waveguide and the shared broadband reflector. Moreover, each lasing cavity has a different wavelength, which is determined by a resonance of the associated ring modulator. The different wavelengths in each of the lasing cavities are combined in the shared waveguide to produce a combined output that emanates from the second end of the shared waveguide.

In some embodiments, each ring modulator in the set of ring modulators simultaneously performs three operations, including: wavelength discrimination; high-speed modulation; and wavelength multiplexing onto the shared waveguide.

In some embodiments, each lasing cavity includes a thermo-optic coefficient (TOC) compensator comprising a section of compensation material. In these embodiments, the lasing cavity includes a length $l_{Si}$ through silicon, a length $l_C$ through the compensation material, and a length $l_{OGM}$ through the optical gain material, wherein the effective refractive index of silicon is $n_{Si}$, the effective refractive index of the compensation material is $n_C$, and the effective refractive index of the optical gain material is $n_{OGM}$. Moreover, the effective TOC of silicon is $dn_{Si}/dT$, the effective TOC of the compensation material is $dn_C/dT$, and the effective TOC of the optical gain material is $dn_{OGM}/dT$. Finally, $l_C \approx l_{OGM}*(dn_{OGM}/dT - dn_{Si}/dT)/(dn_{Si}/dT - dn_C/dT)$, whereby the effective TOC of a portion of the lasing cavity that passes through the optical gain material and the compensation material is substantially the same as the TOC of silicon.

In some embodiments, the set of RSOAs are located on one or more gain chips, which are separate from a semiconductor chip that includes the set of intermediate waveguides, the set of ring modulators, the shared waveguide, and the shared broadband reflector.

In some embodiments, each ring modulator in the set of ring modulators includes a thermal-tuning mechanism.

In some embodiments, each ring modulator in the set of ring modulators comprises a coupled dual-ring modulator.

In some embodiments, each coupled dual-ring modulator includes two rings, which have aligned resonances that are tuned to be offset from each other, so that the coupled dual-ring modulator functions as a filter with a flat-top response, which is aligned with an associated lasing cavity mode.

In some embodiments, each coupled dual-ring modulator includes two rings having different radii, which causes a Vernier effect that provides a combined tuning range that is larger than the gain bandwidth of an associated RSOA.

In some embodiments, the shared broadband reflector comprises one of the following: a loop mirror with a 50/50 directional coupler; a loop mirror with a Y-junction; and a waveguide distributed Bragg reflector (DBR).

DETAILED DESCRIPTION

Figure 1A:
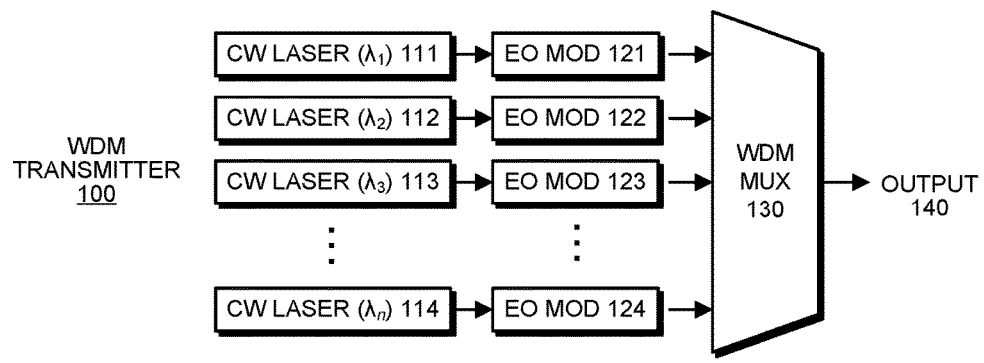
FIG. 1A illustrates a WDM transmitter in accordance with the disclosed embodiments.
Figure 1B:
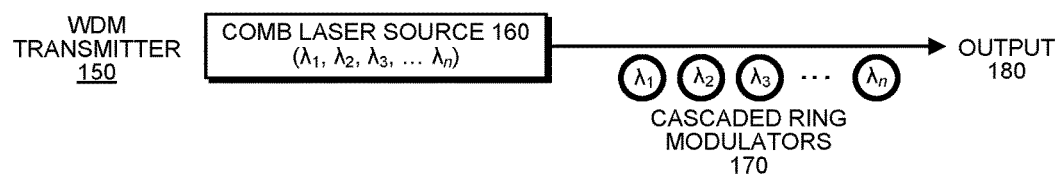
FIG. 1B illustrates another WDM transmitter in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Implementation

In this disclosure, we teach a WDM transmitter with a single multi-function wavelength sensitive device per channel, and which is free of multi-wavelength feedback control. In particular, we teach a technique for fabricating an optical transmitter by using a III-V gain medium integrated with an SOI silicon circuit comprising cascaded silicon ring modulators and a shared broadband reflector. For each WDM channel, a silicon ring modulator is simultaneously used to accomplish three tasks: (1) lasing wavelength discrimination (filtering); (2) high-speed modulation; and (3) wavelength multiplexing onto a common bus. Rings with slightly different optical path lengths are used to create a synthetic optical comb along the common bus. Moreover, a dual-ring modulator configuration can be used to provide a larger free-spectral range for each modulated laser. Local monitoring and control can be used on each ring modulator to ensure optimal alignment of the ring resonance with the lasing cavity mode. Also, a thermo-optically compensated cavity can be used to ensure that the lasing mode drifts at the same rate as the resonance of the ring resonator and the resulting WDM transmitter maintains wavelength channel spacing over temperature changes. Moreover, each wavelength can be modulated at high speed, beyond the photon lifetime limit, by the ring modulator within each cavity. In this way, the complexity associated with feedback and control mechanisms is avoided, which reduces area requirements and power consumption.

Figure 2:
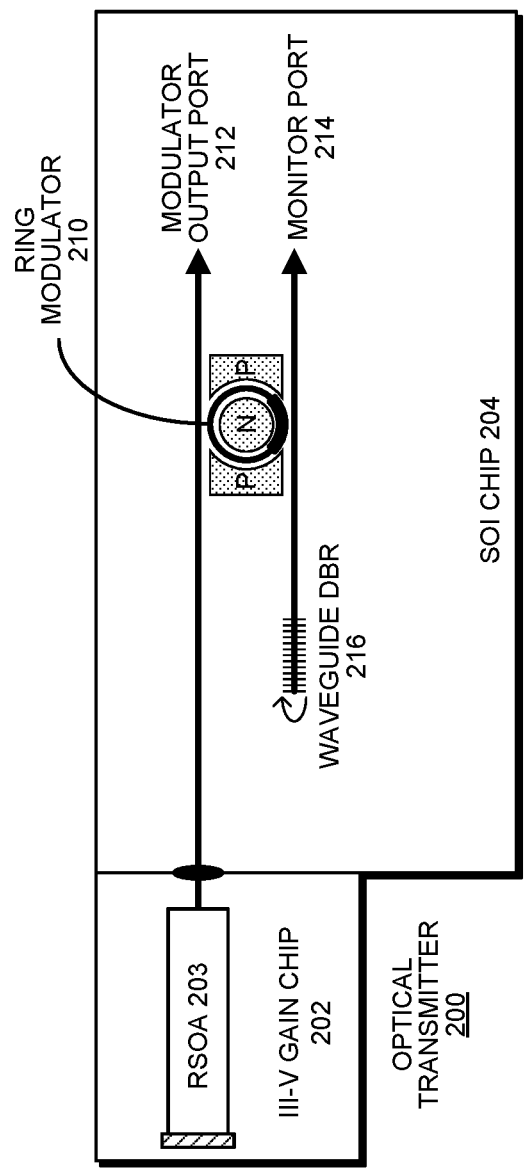
FIG. 2 illustrates an optical transmitter in accordance with the disclosed embodiments.

As depicted in FIG. 2, by using an intra-laser-cavity silicon ring modulator 210, a III-V/Si hybrid optical transmitter 200 can be fabricated, wherein this optical transmitter 200 only requires minimized ring tuning. (See U.S. patent application Ser. No. 15/047,090, entitled "Ring-Resonator-Based Laser with Multiple Wavelengths," by inventors Jock T. Bovington and Xuezhe Zheng, filed on 18 Feb. 2016, which is hereby incorporated herein by reference.) The lasing cavity of optical transmitter 200 is formed by the high-reflective (HR) facet of RSOA 203 located on the III-V gain chip 202, and the waveguide DBR 216 located on SOI chip 204. The wavelength of this external-cavity directly modulated optical transmitter is the cavity mode closest to the ring resonance within the band of the waveguide DBR 216. Note that with asymmetric ring couplings, which are critically coupled for the modulation output and under-coupled for the monitor output, a small resonance shift by the ring modulator causes an insignificant cavity loss change (and, hence, negligible cavity dynamics), but a substantial output optical power change at the modulator output port 212 when the ring resonance is aligned to the lasing cavity mode. Although the exact ring resonance is not known before fabrication due to manufacturing variations, the modulator ring only needs to be tuned to its nearest cavity mode (on a spacing of a few tenths of a nanometer typically). Hence, minimal ring tuning is required. Also, as mentioned above, a simple local feedback technique can be used wherein monitor port 214 is set to minimize power by maximizing the alignment of the ring resonance with the lasing cavity mode. Depending on the efficacy of the TOC compensator 315 described below with reference to FIG. 3, even this local ring control can be turned off.

Figure 3:
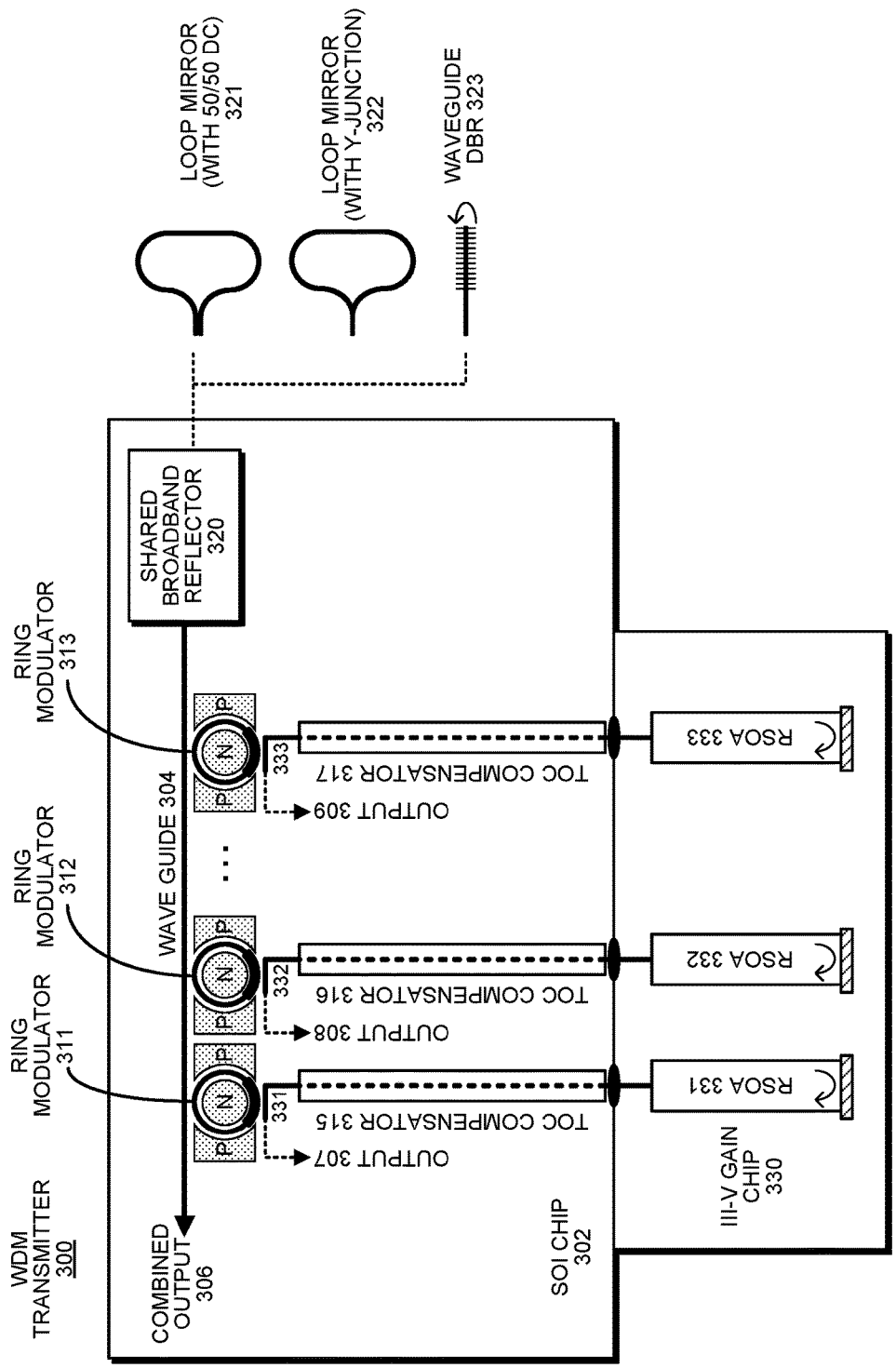
FIG. 3 illustrates an optical transmitter that includes cascaded ring modulators and a shared broadband reflector in accordance with the disclosed embodiments.

FIG. 3 illustrates WDM transmitter 300 designed with a reduced number of components by cascading an array of ring modulators 311-313 on a shared bus waveguide 304, which is connected to a shared broadband reflector 320. Moreover, separated drop ports, which include L-shaped couplers 331-333, obtain optical signals from ring modulators 311-313 and feed them into a set of III-V RSOAs 331-333 located on a separate III-V gain chip 330. Note that silicon ring modulators 311-313 can be fabricated with slightly different radii to have the resonance order of interest of each ring spaced one channel spacing apart. Moreover, the shared broadband reflector 320 can be implemented in a number of ways, for example by using: (1) a loop mirror with a 50/50 directional coupler 321; (2) a loop mirror with a Y-junction (322); or (3) a DBR comprised of gratings on a silicon waveguide 323. The RSOAs 331-333 (which are located on III-V gain chip 330) are aligned and coupled to the separated drop ports of the ring modulators (which are located on SOI chip 302) via edge optical proximity coupling, which, for example, can involve: edge-to-edge butt coupling; or surface-normal coupling using facet mirror or grating couplers.

The HR mirrors of RSOAs 331-333 and the shared broadband reflector 320 form an array of partially shared lasing cavities, wherein each lasing cavity lases at a wavelength determined by the ring resonance and the cavity mode closest to the ring resonance. Because the ring resonances are spaced apart and each channel has its own gain, a laser wavelength comb can be formed with little mode competition in spite of the fact that the laser cavities are partially shared. Furthermore, each ring can be equipped with a thermal phase tuner (metal or silicon resistor based), so the lasing wavelength of each channel can be fine-tuned to compensate for channel spacing non-uniformity due to fabrication variations. By slightly offsetting the ring resonance peak from the aligned cavity mode, and applying modulation to ring modulators 311-313, the ring resonances dither around the lasing cavity modes. The outputs from modulators 311-313 are combined on shared waveguide 304 to produce a combined output 306 at the left-hand end of shared waveguide 304. Moreover, the L-shared couplers 331-333 can also provide individual wavelength outputs 307-309, wherein the transmitter 300 can be designed to favor these individual outputs 307-308 while sharing the common broadband reflector 320.

Because of the different thermo-optic coefficients (TOCs) of silicon and the III-V gain material, the position of the laser cavity modes will drift at a different rate from those of the ring resonances when the ambient temperature changes. This can cause "walk-offs" between the aligned ring resonances and the lasing cavity mode if the ambient temperature changes significantly, which will result in mode-hopping that is fatal to high-speed communication links. The mode-hopping problem can be solved by using an active closed-loop feedback control system. However, this will not prevent drift of the entire array with temperature because each of the wavelength channels in the array will drift with temperature at a rate of approximately 0.08 nm/° C. This drift can cause a large tuning-range requirement for each ring (or dual-ring pair for the embodiment illustrated in FIG. 4). An elegant solution to remove drift and related tuning requirements is to add simple TOC compensators 315-317 having properly selected lengths to the lasing cavities, which can effectively eliminate temperature-induced mode hopping. (See U.S. patent application Ser. No. 15/292,501, entitled "Surface-Normal Optical Coupling Interface with Thermal-Optic Coefficient Conversion," by inventors Ying L. Luo, Xuezhe Zheng and Ashok V. Krishnamoorthy, filed 13 Oct. 2016, which is incorporated by reference herein.)

Note that TOC compensators 315-317 can be implemented using a

SiON waveguide (or another material with a thermo-optic coefficient lower than silicon) with proper low-loss transition to the silicon waveguides. Assume the effective lengths of the three materials Si, SiON and III-V in the hybrid cavity are $L_1$, $L_2$, and $L_3$, their refractive indices are $n_1$, $n_2$, and $n_3$, and their thermo-optic coefficients are $dn_1/dT$, $dn_2/dT$ and $dn_3/dT$, respectively. The changes in optical path length of the cavity mode $\Delta nL$ due to temperature variation $\Delta T$ can be expressed as $$\Delta nL = (dn_1/dT*L_1 + dn_2/dt*L_2 + dn_3/dT*L_3)*\Delta T.$$

We can make the average $do/dT$ of the hybrid cavity equal to $dn_1/dT$ by choosing $$L_2 = (dn_3/dT - dn_1/dT)/(dn_1/dT - dn_2/dT)*L_3.$$

Implementing the TOC compensator waveguide with the right length for each channel, the cavity modes will drift at the same pace as the silicon ring modulator. Hence, once the initial alignment is done, no further active tuning control is required to keep the hybrid laser from mode-hopping due to TOC mismatch. In the event that the TOC compensation is imperfect and some residual drift versus temperature occurs, each ring modulator 311-313 can be locally monitored and controlled to ensure that they operate free of mode hopping. Note that because the rings are located in close proximity to each other on the silicon photonic substrate, the effective comb wavelengths will tend to move in unison as a result of temperature variations. Hence, by using TOC compensators 315-317, wavelength separation will be maximized, and crosstalk will be minimized.

Figure 4:
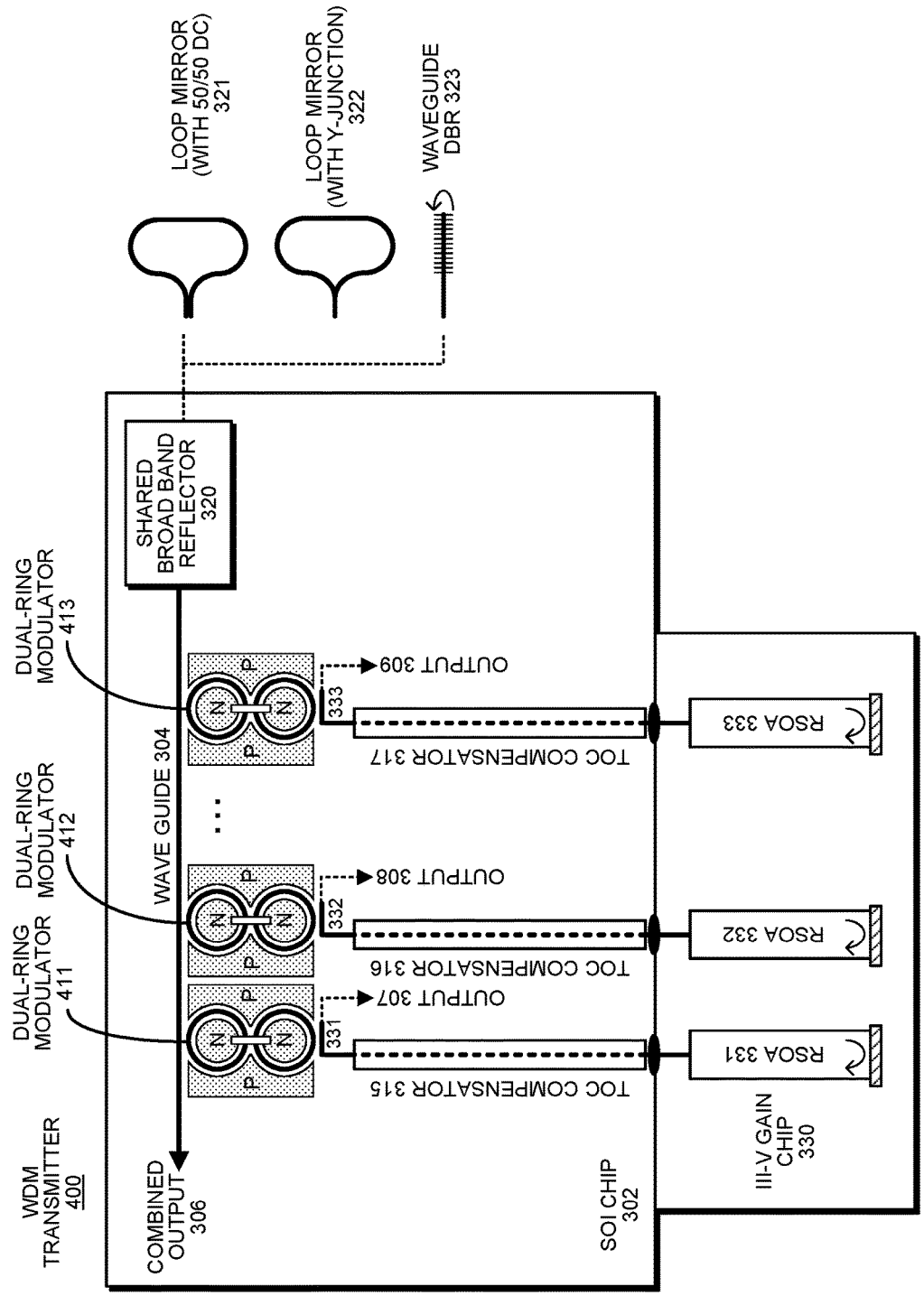
FIG. 4 illustrates an optical transmitter that includes cascaded coupled dual-ring modulators and a shared broadband reflector in accordance with the disclosed embodiments.

The aforementioned single-ring modulator based WDM transmitter 300 greatly simplifies the operation and complexity of a WDM transmitter; however, design challenges still remain. When a ring resonance shifts relative to an associated lasing cavity mode, the effective length and the effective cavity loss both change. The cavity effective length change leads to chirping to the output signal, while the cavity loss change results in a modulation penalty due to the slow dynamics of cavity loss modulation in a long cavity hybrid laser. In addition, the FSR of a single-ring modulator is typically smaller than the gain bandwidth of the III-V RSOAs. Hence, there is a potential risk of FSR mode-hopping for each channel. Fortunately, using dual-ring modulators can effectively eliminate both risks as is illustrated in the embodiment presented in FIG. 4. As shown in FIG. 4, by replacing the single-ring modulators 311-313 with coupled dual-ring modulators 411-413, a III-V/Si hybrid WDM transmitter 400 with minimized chirp and stable cavity dynamics can be obtained. Note that the two rings in each dual-ring modulator 411-413 can be designed with slightly different radii. In this way, the Vernier effect associated with the resonances of the two rings results in an effective ring FSR, which is larger than the RSOA gain bandwidth. This can be used to eliminate the possibility of FSR jumping. Furthermore, the aligned resonances of two rings can be tuned to be slightly offset from each other to create a filter with a small flat-top response, which is aligned with the lasing cavity mode. Note that modulation will dither the resonances of the two rings simultaneously around the lasing cavity mode, resulting in a lasing cavity with a constant loss and a constant effective length, while the output to the shared bus waveguide is modulated. Similarly, by using the built-in TOC compensators 315-317 on each channel, no active tuning control is necessary after the initial ring-resonance tuning and alignment. (In an alternative embodiment, two separated ring modulators with a shared bus waveguide in the middle can be used to achieve the same functionality as the coupled dual-ring modulators 411-413.)

Operation

Figure 5:
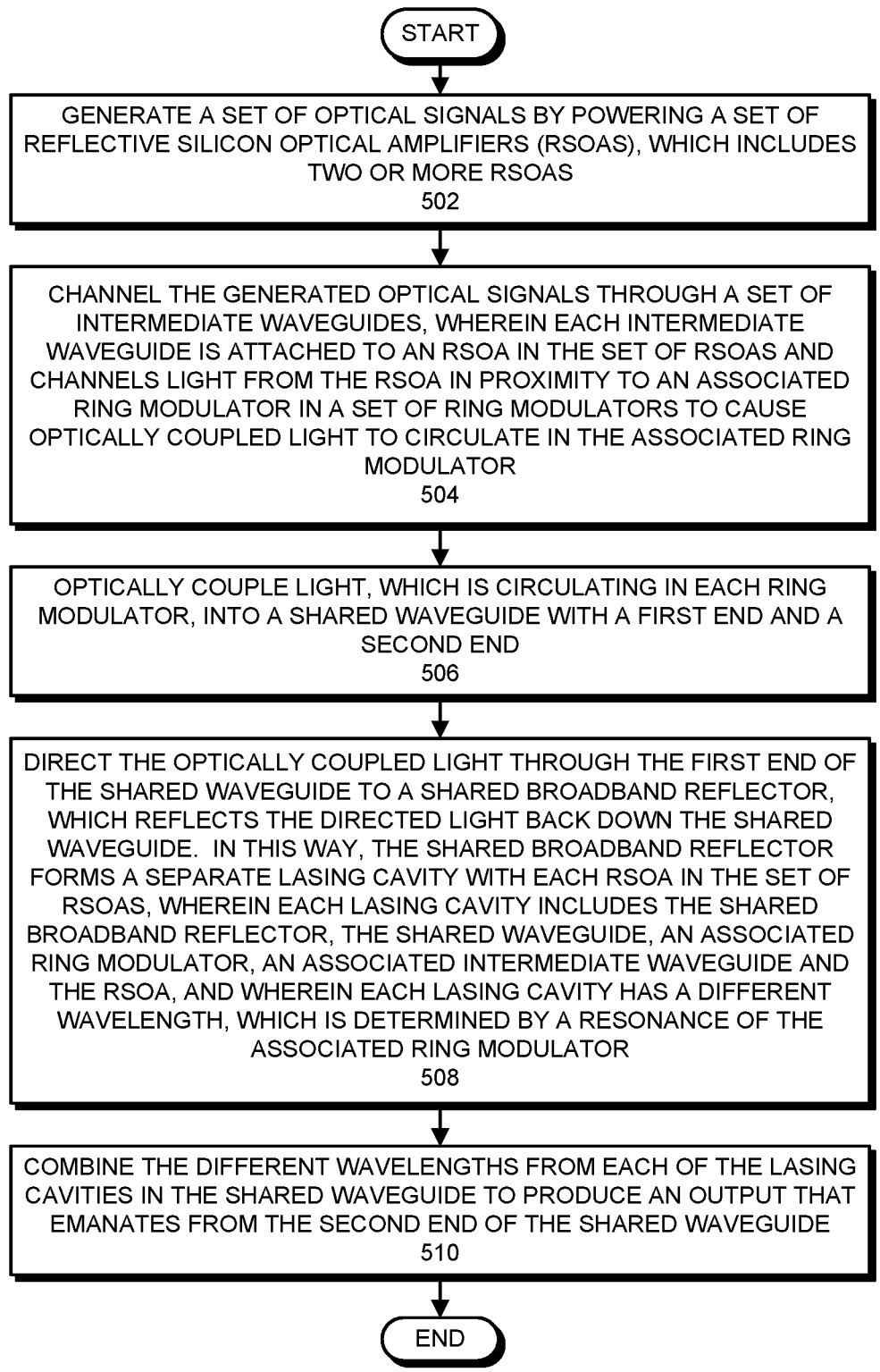
FIG. 5 presents a flow chart illustrating actions performed during operation of the optical transmitter in accordance with the disclosed embodiments.

During operation, the hybrid optical transmitter system described with respect to the embodiments discussed above operates as illustrated in the flow chart in FIG. 5. First, the system generates a set of optical signals by powering a set of RSOAs, which includes two or more RSOAs (step 502). Next, the system channels the generated optical signals through a set of intermediate waveguides, wherein each intermediate waveguide is attached to a corresponding RSOA in the set of RSOAs, and channels light from the RSOA in proximity to an associated ring modulator in a set of ring modulators to cause optically coupled light to circulate in the associated ring modulator (step 504). Then, the system optically couples the light, which is circulating in each ring modulator into a shared waveguide with a first end and a second end (step 506).

Next, the system directs the optically coupled light through the first end of the shared waveguide to a shared broadband reflector, which reflects the directed light back down the shared waveguide (step 508). In this way, the shared broadband reflector forms a separate lasing cavity with each RSOA in the set of RSOAs, wherein each lasing cavity includes the shared broadband reflector, the shared waveguide, an associated ring modulator, an associated intermediate waveguide and the RSOA. Moreover, each lasing cavity has a different wavelength, which is determined by a resonance of the associated ring modulator. Finally, the system combines the different wavelengths from each of the lasing cavities in the shared waveguide to produce a combined output that emanates from the second end of the shared waveguide (step 510).

System

Figure 6:
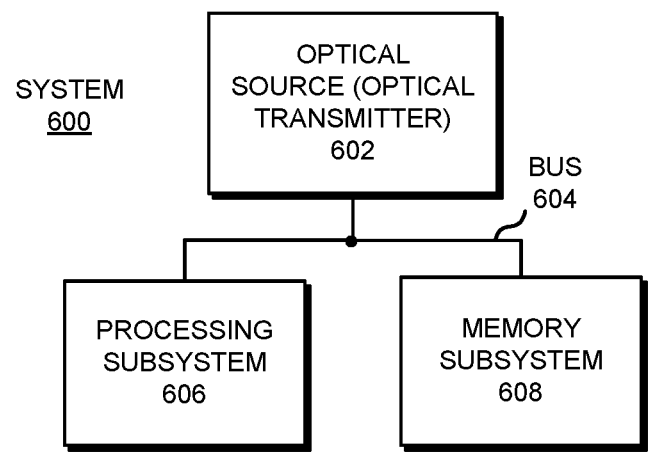
FIG. 6 illustrates a system that includes an optical source, such as an optical transmitter, in accordance with an embodiment of the present disclosure.

One or more of the preceding embodiments of the tunable laser may be included in a system or device. More specifically, FIG. 6 illustrates a system 600 that includes an optical source 602, which includes an optical transmitter. System 600 also includes a processing subsystem 606 (with one or more processors) and a memory subsystem 608 (with memory).

In general, components within optical source 602 and system 600 may be implemented using a combination of hardware and/or software. Thus, system 600 may include one or more program modules or sets of instructions stored in a memory subsystem 608 (such as DRAM or another type of volatile or non-volatile computer-readable memory), which, during operation, may be executed by processing subsystem 606. Furthermore, instructions in the various modules in memory subsystem 608 may be implemented in: a high-level procedural language, an object-oriented programming language, and/or in an assembly or machine language. Note that the programming language may be compiled or interpreted, e.g., configurable or configured, to be executed by the processing subsystem.

Components in system 600 may be coupled by signal lines, links or buses, for example bus 604. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 600 may be at one location or may be distributed over multiple, geographically dispersed locations.

System 600 may include: a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, optical source 602 can be used in a wide variety of applications, such as: communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An optical transmitter, comprising:
   a set of reflective silicon optical amplifiers (RSOAs), which includes two or more RSOAs;
   a set of ring modulators, which modulate optical signals based on electrical input signals;

a shared broadband reflector;
a set of intermediate waveguides, wherein each intermediate waveguide in the set is coupled to an RSOA in the set of RSOAs, and channels light from the RSOA in proximity to an associated ring modulator in the set of ring modulators to cause optically coupled light to circulate in the associated ring modulator; and
a shared waveguide with a first and a second end, wherein the first end is coupled to the shared broadband reflector, and wherein the shared waveguide passes in proximity to the set of ring modulators, so that light circulating in each ring modulator in the set causes optically coupled light to flow in the shared optical waveguide; and
wherein each RSOA in the set of RSOAs forms a lasing cavity, which includes an associated intermediate waveguide in the set of intermediate waveguides, an associated ring modulator in the set of ring modulators, the shared waveguide and the shared broadband reflector;
wherein each lasing cavity has a different wavelength, which is determined by a resonance of the associated ring modulator; and
wherein the different wavelengths in each of the lasing cavities are combined in the shared waveguide to produce a combined output that emanates from the second end of the shared waveguide.

2. The optical transmitter of claim 1, wherein each ring modulator in the set of ring modulators simultaneously performs three operations, including:
wavelength discrimination;
high-speed modulation; and
wavelength multiplexing onto the shared waveguide.

3. The optical transmitter of claim 1,
wherein each lasing cavity includes a thermo-optic coefficient (TOC) compensator comprising a section of compensation material;
wherein the lasing cavity includes a length $l_{Si}$ through silicon, a length $l_C$ through the compensation material, and a length $l_{OGM}$ through the optical gain material;
wherein the effective refractive index of silicon is $n_{Si}$, the effective refractive index of the compensation material is $n_C$, and the effective refractive index of the optical gain material is $n_{OGM}$;
wherein the effective TOC of silicon is $dn_{Si}/dT$, the effective TOC of the compensation material is $dn_C/dT$, and the effective TOC of the optical gain material is $dn_{OGM}/dT$; and
wherein $lc \approx l_{OGM}*(dn_{OGM}/dT - dn_{Si}/dT)/(dn_{Si}/dT - dn_C/dT)$, whereby the effective TOC of a portion of the lasing cavity that passes through the optical gain material and the compensation material is substantially the same as the TOC of silicon.

4. The optical transmitter of claim 1, wherein the set of RSOAs are located on one or more gain chips, which are separate from a semiconductor chip that includes the set of intermediate waveguides, the set of ring modulators, the shared waveguide, and the shared broadband reflector.

5. The optical transmitter of claim 1, wherein each ring modulator in the set of ring modulators includes a thermal-tuning mechanism.

6. The optical transmitter of claim 1, wherein each ring modulator in the set of ring modulators comprises a coupled dual-ring modulator.

7. The optical transmitter of claim 6, wherein each coupled dual-ring modulator includes two rings, which have aligned resonances that are tuned to be offset from each other, so that the coupled dual-ring modulator functions as a filter with a flat-top response, which is aligned with an associated lasing cavity mode.

8. The optical transmitter of claim 6, wherein each coupled dual-ring modulator includes two rings having different radii, which causes a Vernier effect that provides a combined tuning range that is larger than the gain bandwidth of an associated RSOA.

9. The optical transmitter of claim 1, wherein the shared broadband reflector comprises one of the following:
a loop mirror with a 50/50 directional coupler;
a loop mirror with a Y-junction; and
a waveguide distributed Bragg reflector (DBR).

10. A system, comprising:
at least one processor;
at least one memory coupled to the at least one processor; and
an optical transmitter for communicating optical signals generated by the system, wherein the optical transmitter includes:
a set of reflective silicon optical amplifiers (RSOAs), which includes two or more RSOAs;
a set of ring modulators, which modulate optical signals based on electrical input signals;
a shared broadband reflector;
a set of intermediate waveguides, wherein each intermediate waveguide in the set is coupled to an RSOA in the set of RSOAs, and channels light from the RSOA in proximity to an associated ring modulator in the set of ring modulators to cause optically coupled light to circulate in the associated ring modulator; and
a shared waveguide with a first and a second end, wherein the first end is coupled to the shared broadband reflector, and wherein the shared waveguide passes in proximity to the set of ring modulators, so that light circulating in each ring modulator in the set causes optically coupled light to flow in the shared optical waveguide;
wherein each RSOA in the set of RSOAs forms a lasing cavity, which includes an associated intermediate waveguide in the set of intermediate waveguides, an associated ring modulator in the set of ring modulators, the shared waveguide and the shared broadband reflector;
wherein each lasing cavity has a different wavelength, which is determined by a resonance of the associated ring modulator; and
wherein the different wavelengths in each of the lasing cavities are combined in the shared waveguide to produce a combined output that emanates from the second end of the shared waveguide.

11. The system of claim 10, wherein each ring modulator in the set of ring modulators simultaneously performs three operations, including:
wavelength discrimination;
high-speed modulation; and
wavelength multiplexing onto the shared waveguide.

12. The system of claim 10,
wherein each lasing cavity includes a thermo-optic coefficient (TOC) compensator comprising a section of compensation material;
wherein the lasing cavity includes a length $l_{Si}$ through silicon, a length $l_C$ through the compensation material, and a length $l_{OGM}$ through the optical gain material;

wherein the effective refractive index of silicon is $n_{Si}$, the effective refractive index of the compensation material is $n_C$, and the effective refractive index of the optical gain material is $n_{OGM}$;

wherein the effective TOC of silicon is $dn_{Si}/dT$, the effective TOC of the compensation material is $dn_C/dT$, and the effective TOC of the optical gain material is $dn_{OGM}/dT$; and wherein $lc \approx l_{OGM}*(dn_{OGM}/dT - dn_{Si}/dT)/(dn_{Si}/dT - dn_C/dT)$, whereby the effective TOC of a portion of the lasing cavity that passes through the optical gain material and the compensation material is substantially the same as the TOC of silicon.

13. The system of claim 10, wherein the set of RSOAs are located on one or more gain chips, which are separate from a semiconductor chip that includes the set of intermediate waveguides, the set of ring modulators, the shared waveguide, and the shared broadband reflector.

14. The system of claim 10, wherein each ring modulator in the set of ring modulators includes a thermal-tuning mechanism.

15. The system of claim 10, wherein each ring modulator in the set of ring modulators comprises a coupled dual-ring modulator.

16. The system of claim 15, wherein each coupled dual-ring modulator includes two rings, which have aligned resonances that are tuned to be offset from each other, so that the coupled dual-ring modulator functions as a filter with a flat-top response, which is aligned with an associated lasing cavity mode.

17. The system of claim 15, wherein each coupled dual-ring modulator includes two rings having different radii, which causes a Vernier effect that provides a combined tuning range that is larger than the gain bandwidth of an associated RSOA.

18. The optical transmitter of claim 1, wherein the shared broadband reflector comprises one of the following:
a loop mirror with a 50/50 directional coupler;
a loop mirror with a Y-junction; and
a waveguide distributed Bragg reflector (DBR).

19. A method for operating an optical transmitter, comprising:
generating a set of optical signals by powering a set of reflective silicon optical amplifiers (RSOAs), which includes two or more RSOAs;
channeling the generated optical signals through a set of intermediate waveguides, wherein each intermediate waveguide in the set is attached to an RSOA in the set of RSOAs and channels light from the RSOA in proximity to an associated ring modulator in a set of ring modulators to cause optically coupled light to circulate in the associated ring modulator;
optically coupling light, which is circulating in each ring modulator in the set of ring modulators, into a shared waveguide with a first end and a second end;
directing the optically coupled light through the first end of the shared waveguide to a shared broadband reflector, which reflects the directed light back down the shared waveguide, wherein the shared broadband reflector forms a separate lasing cavity with each RSOA in the set of RSOAs, wherein each lasing cavity includes the shared broadband reflector, the shared waveguide, an associated ring modulator in the set of ring modulators, an associated intermediate waveguide in the set of intermediate waveguides and the RSOA, and wherein each lasing cavity has a different wavelength, which is determined by a resonance of the associated ring modulator; and
combining the different wavelengths from each of the lasing cavities in the shared waveguide to produce an output that emanates from the second end of the shared waveguide.

20. The method of claim 19, wherein each ring modulator in the set of ring modulators simultaneously performs three operations, including:
wavelength discrimination;
high-speed modulation; and
wavelength multiplexing onto the shared waveguide.

* * * * *

UNITED STATES PATENT AND TRADEMARK OFFICE
CERTIFICATE OF CORRECTION

PATENT NO. : 10,120,211 B2
APPLICATION NO. : 15/346565
DATED : November 6, 2018
INVENTOR(S) : Zheng et al.

Page 1 of 1

It is certified that error appears in the above-identified patent and that said Letters Patent is hereby corrected as shown below:

In the Specification

In Column 6, Lines 11-19, delete "SiON waveguide (or another material with a thermo-optic coefficient lower than silicon) with proper low-loss transition to the silicon waveguides. Assume the effective lengths of the three materials Si, SiON and III-V in the hybrid cavity are $L_1$, $L_2$, and $L_3$, their refractive indices are $n_1$, $n_2$, and $n_3$, and their thermo-optic coefficients 10 are $dn_1/dT$, $dn_2/dT$ and $dn_3/dT$, respectively. The changes in optical path length of the cavity mode $\Delta nL$ due to temperature variation $\Delta T$ can be expressed as" and insert the same on Column 6, Line 10, as a continuation of the same paragraph.

In Column 6, Line 21, delete "/dt*" and insert -- /dT* --, therefor.

Signed and Sealed this
Twenty-second Day of October, 2019

Andrei Iancu
*Director of the United States Patent and Trademark Office*